Aug. 11, 1942.   J. HILLIER   2,292,877
MAGNETIC LENS
Filed Oct. 16, 1940   2 Sheets-Sheet 1
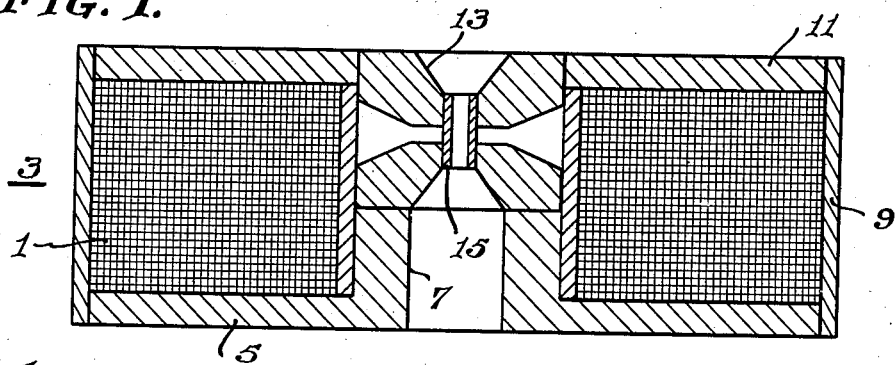
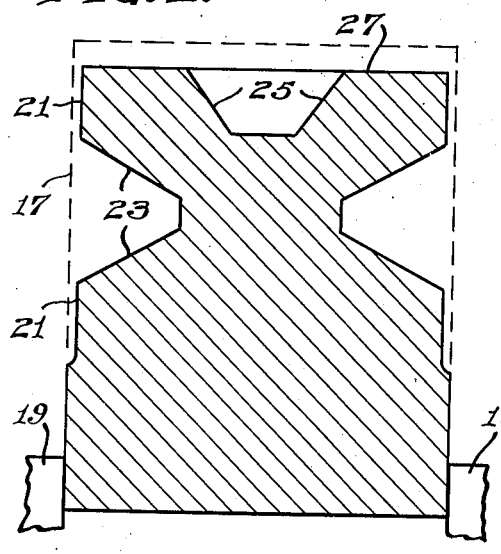
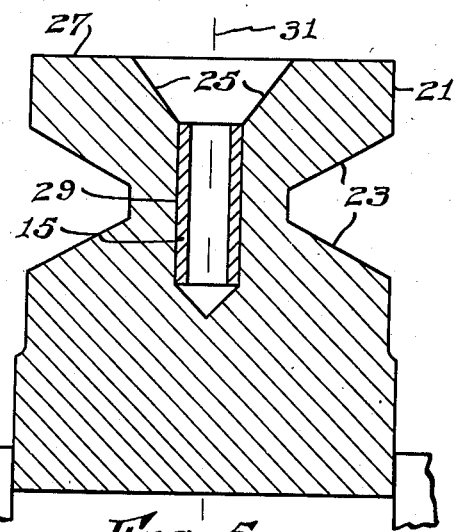
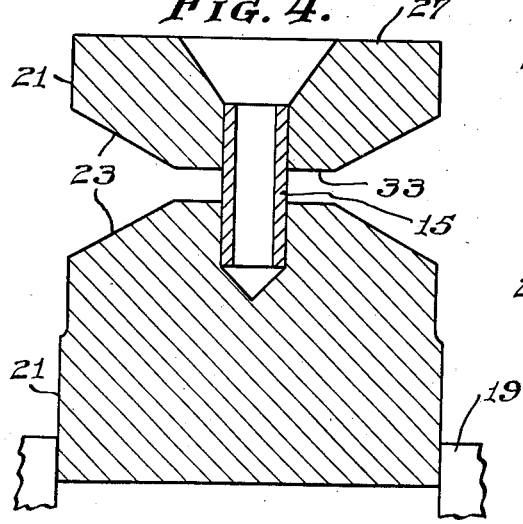
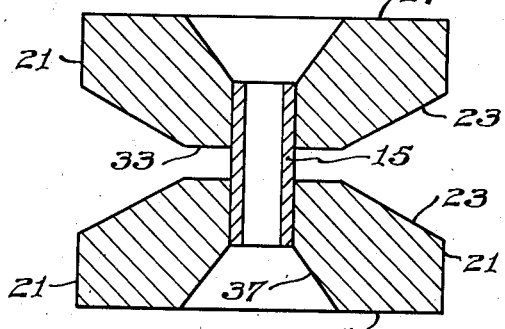
Inventor
James Hillier
Attorney

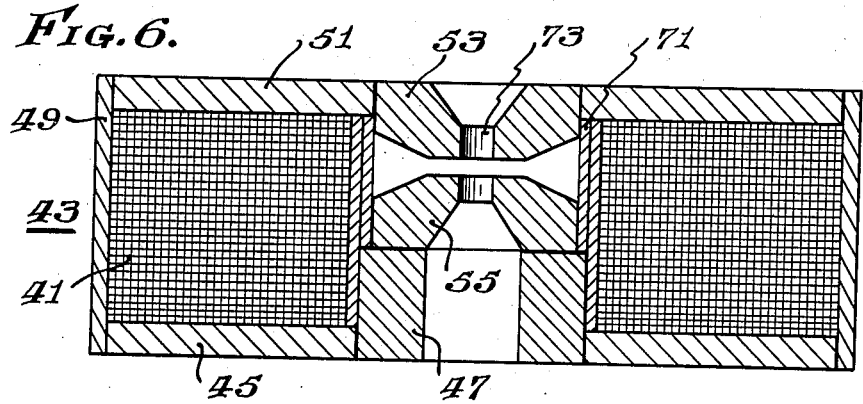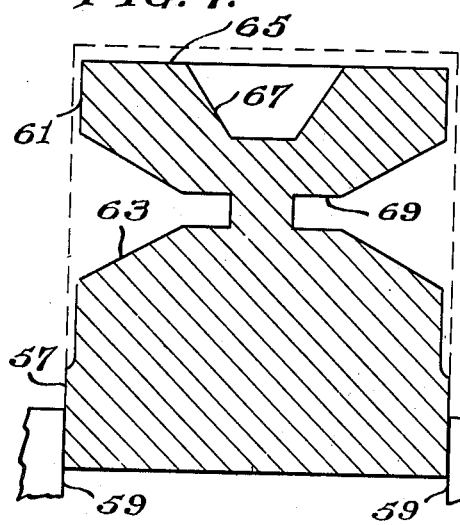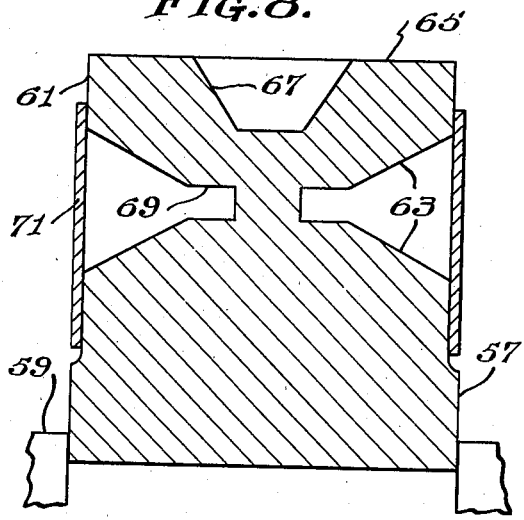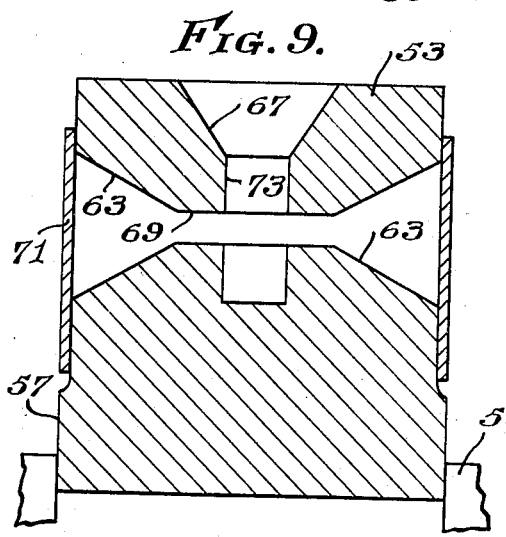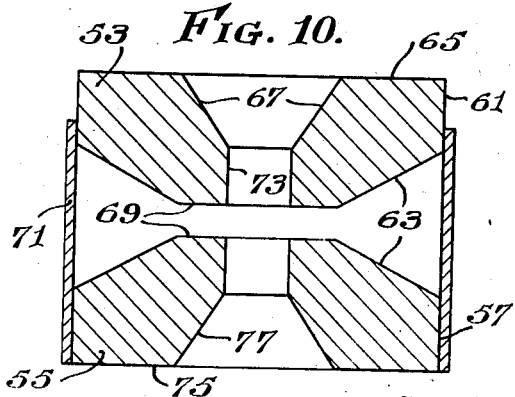

Patented Aug. 11, 1942

2,292,877

UNITED STATES PATENT OFFICE 2,292,877

MAGNETIC LENS

James Hillier, Collingswood, N. J., assignor to Radio Corporation of America, a corporation of Delaware Application October 16, 1940, Serial No. 361,348

5 Claims. (Cl. 250—49.5)

This invention relates to magnetic lenses of the type used in electron microscopes and the like and especially to the method or process of making the pole pieces for such lenses.

It has been shown that a magnetic field may be used to focus electron rays in a manner analogous to the focusing of light rays by an optical lens. By a suitable arrangement of lenses, a magnified image of an object may be formed by electron rays passing through the object. Magnifications of the order of twenty or more thousand times have been used. Magnifications of that order require extremely accurate lenses if objectionable aberrations are to be avoided.

The pole pieces of magnetic lenses should possess axial symmetry and the axes should be collinear. These conditions may be best met by turning all the active surfaces of the pole pieces in the manner hereinafter described.

It is therefore an object of this invention to provide a method of manufacturing magnetic pole pieces for electron lenses and the like. Another object is to provide a method for machining magnetic pole pieces from one piece of material in a series of steps which assure accurate symmetrical surfaces and a collinear axis. An additional object is to provide a method for machining the pole pieces of a magnetic lens and for maintaining a collinear relation by means of a non-magnetic material. A still further object is to provide means for retaining the alignment of a pair of pole pieces of a magnetic lens to form a unitary structure.

The invention will be described by referring to the accompanying drawings, in which Figure 1 is a sectional view of a preferred embodiment of a magnetic lens; Figures 2, 3, 4 and 5 are sectional views illustrating the method of machining the pole pieces; Figure 6 is a sectional view of a modified magnetic lens; and Figures 7, 8, 9 and 10 are sectional views illustrating a modified method of machining the pole pieces.

Referring to Fig. 1, a magnetic lens is formed by surrounding a solenoid winding 1 with a magnetic shell 3. The shell includes a base plate 5 which has an inwardly extending coaxial tubular portion 7, a cylindrical outer shell 9 and an annular top plate 11. The parts of the shell are preferably held together by drive fits; or mechanical fastening means, such as screws or threaded parts, may be used. The lens is completed by pole pieces 13, which include a pair of symmetrical members, maintained in spaced relation by a non-magnetic tubular spacer 15 to form a unitary structure. The shell, which is made of magnetic material, and the pole pieces are held together by a drive fit or any suitable means.

The pole pieces are machined from a single blank which is secured to the clutch jaws 19 of a lathe, automatic screw machine or the like. The first operation is to turn the blank to form the outer walls 21, inwardly extending sloping side walls 23, sloping top wall 25 and flat top wall 27. The second operation is to bore a hole 29 along the axis 31 to a depth not less than the final length of the inner cylindrical walls of the pole piece. The third step is to shrink and insert within said hole a non-magnetic retainer or spacer so that it forms a tight fit upon expansion. The non-magnetic retainer is drilled along its axis to form an opening corresponding to the finished inner cylindrical walls of the pole pieces. The blank after the completion of the third step is shown in Fig. 3. The fourth step is to divide the magnetic portions of the pole pieces by cutting the gap 33 (see Fig. 4) from the sloping side walls 23 to the outer portion of the non-magnetic tubular retainer 15. The fifth and final step is to cut from the outer wall 21 inwardly to form the lower flat bottom wall 25 and the bottom inwardly sloping wall 37.

It should be understood that the invention contemplates a reversal of parts; i. e., the non-magnetic retainer may surround the pole pieces instead of having the pole pieces surround the retainer. If the parts are thus reversed, the lens will appear as shown in Fig. 6 in which a solenoid coil 41 is surrounded by a shell 43 of magnetic material. The shell includes a base plate 45, an inwardly extending tubular portion 47, an outer cylindrical member 49, and an annular top plate 51. The pole pieces 53 are tightly fitted between the top plate 51 and the tubular portion 47.

The method of machining the pole pieces will be described by referring to Figs. 7, 8, 9 and 10. A blank 57 is fastened to a lathe or the like by means of chuck jaws 59. The blank is machined to form the outer cylindrical wall 61, including inwardly sloping portion 63. The inwardly sloping portion 63 is extended by cutting parallel to the flat plate 65 to form a gap 69. The end of the blank is cut to form a flat plate 65 and an inwardly sloping portion 67. The next step is to fit tightly a non-magnetic tubular retaining member 71 around the cylindrical wall 61. The retainer is preferably shorter than the cylindrical wall so that the magnetic portion of the upper pole piece 53 contacts the annular plate 51 to complete the magnetic circuit.

The blank is bored along its axis to form the inner cylindrical surfaces 73 of the pole pieces. The next steps are to cut the blank at the lower portion of the pole pieces to form a bottom wall 75 parallel to the annular top plate 65 and finally to cut the inwardly sloping portion 77.

In both the present method and the first described or preferred method the separating of the pole pieces from the blank may be done by clamping the pole pieces in a collet or other chuck so that the bottom wall and sloping wall portion may be machined from the front instead of the rear. Any slight inaccuracy caused by thus removing the piece from the original position for the cutting off operation will have no observable effect on the lens because the lens field is essentially located between the inner cylindrical walls and adjoining parallel walls.

Since all of the foregoing operations may be performed without removing the blank from the machine, it follows that the pole pieces may be made symmetrical, and collinear. Furthermore, the foregoing steps are simple turning operations which can be performed accurately and inexpensively. The non-magnetic tubular portion retains the pole pieces in the desired alignment without affecting the field and makes the pole pieces a unitary structure.

I claim as my invention:

1. The process of machining pole pieces from a single blank of magnetic material and a non-magnetic retainer which includes machining said blank to form a portion of the walls of said pole pieces, fitting said non-magnetic retainer to said machined walls to hold securely together the upper and lower portions of said pole pieces, forming the inner cylindrical wall of said pole pieces, and separating the thus machined pole pieces from the balance of said blank bu cutting the bottom wall of the lower portion of said pole piece.

2. The process of machining pole pieces from a single blank of magnetic material and a non-magnetic retainer which includes machining said blank to form some of the cylindrical and end walls of said pole pieces, fitting said non-magnetic retainer to said cylindrical walls to hold securely together the upper and lower portions of said pole pieces, forming the inner cylindrical wall of said pole pieces, and separating the thus machined pole pieces from the balance of said blank by cutting the bottom wall of the lower portion of said pole piece.

3. The method of machining a unitary symmetrical and collinear pole piece structure from a single blank of magnetic material and a non-magnetic retainer which includes the steps of turning said blank to form an outer wall and a top wall, drilling a hole into said blank along the axis of said turning from said top wall to a bottom wall to be formed, driving a non-magnetic retainer in said hole, drilling a hole in said retainer to form the inner cylindrical wall of said pole pieces, forming an upper and a lower pole piece by cutting a gap in said blank from said outer wall to the outer portion of said spacer, and separating the thus formed pole piece from said blank by cutting through said blank to form a bottom wall for said lower pole piece.

4. The method of machining a unitary symmetrical and collinear pole piece structure from a single blank of magnetic material and a non-magnetic retainer which includes the steps of turning said blank to form an outer wall and a top wall, drilling a hole into said blank along the axis of said turning from said top wall to a bottom wall to be formed, driving a non-magnetic retainer in said hole, drilling a hole in said retainer to form the inner cylindrical wall of said pole pieces, forming an upper and a lower pole piece by cutting a gap in said blank from said outer wall to the outer portion of said spacer and parallel to said top wall, and separating the thus formed pole piece from said blank by cutting through said blank to form a bottom wall for said lower pole piece, said bottom wall being parallel to said top wall.

5. The method of forming pole pieces from a single blank of magnetic material and a non-magnetic retainer which includes the steps of turning the outer walls, inwardly sloping top wall and flat top wall, drilling a coaxial aperture from said sloping top wall through said blank, fitting a non-magnetic retainer within said aperture, drilling a coaxial aperture through said retainer to form the inner cylindrical walls of said pole pieces, cutting a gap from said inwardly sloping walls to the outer surface of said retainer, cutting said blank to form a bottom flat wall and cutting an inwardly sloping wall from said bottom flat wall to said retainer to separate the thus machined pole pieces from the balance of said blank.

JAMES HILLIER.